United States Patent Office  3,488,289
Patented Jan. 6, 1970

3,488,289
COMPOSITION AND METHOD FOR TREATING SCALE
Jack F. Tate, Houston, Tex., assignor to Texaco Inc., New York, N.Y., a corporation of Delaware
No Drawing. Filed June 24, 1966, Ser. No. 560,086
Int. Cl. C02b 5/06
U.S. Cl. 252—180         16 Claims

ABSTRACT OF THE DISCLOSURE

Method of and composition for the treatment of oil and gas wells to prevent and/or inhibit the build-up of undesirable sulfate scale deposits in aqueous systems therein employing a phosphate ester of a prescribed formula in an amount sufficient to inhibit the development of said scale. The composition consists essentially of an alkaline aqueous solution of the phosphate ester or mixtures thereof wherein the alkaline reagent provides a pH of 7.1–8 to the system and may contain a lower alkanol or glycol additive.

This invention relates to a compositon useful in treating oil and gas wells and to a method of using such composition for such treatment. More particularly, this invention is directed to a composition and method useful in the prevention and/or inhibition of the build-up of undesirable scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to scale formation.

The formation of objectionable scale deposits, such as calcium or barium sulfate is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore results in the precipitation of a hard crystalline calcium sulfate deposit which gradually builds up on the walls of the well tubing, for example, to a point where it would choke off fluid flow in the tube if remedial measures were not undertaken.

Another cause of scale formation is attributed to the precipitation of scale material from supersaturated salt solutions containing the same. When such solutions pass from strata wherein temperatures and pressures are relatively high into the relatively low temperature and pressure area at or about the well bore, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after realtively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This deposit of precipitate may then be removed by suitable mechanical means. Such a method is obviously undesirable in that considerable periods of time are involved and the use of mechanical apparatus is expensive, and in some cases, either undesirable or mechanically impossible. Moreover, strong alkali is not effective in preventing or inhibiting the build-up of scale deposits in well tubing, production equipment and the producing strata about the bore hole.

It is, accordingly, an object of this invention to provide a method of inhibiting and/or preventing the build-up of scale deposits in gas and oil flow lines, auxiliary equipment, well tubing and the surrounding subsurface strata.

A further object is to provide a scale treating composition for use in preventing the build-up of scale deposits in the well tubing, producing equipment, the bore hole and surrounding strata.

A still further object of this invention is to provide a method of and composition for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition comprising a phosphate ester having the general formula

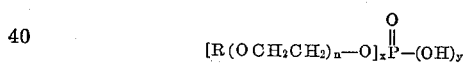

wherein R is a $C_6$–$C_{12}$ alkylphenyl radical or a $C_{12}$–$C_{18}$ alkyl radical, $n$ is a number from 1 to 20, both $x$ and $y$ are 1 or 2 and the sum of $x$ and $y$ is 3, said ester having a molecular weight in the range of from about 500 to about 1000, said treating composition being employed in an amount sufficient to inhibit the development of scale in an aqueous system.

The invention also comprises a method of treating equipment susceptible to the development of scale deposits therein such as water storage tanks and the like, particularly oil field equipment, using the scale prevention composition.

The phosphate esters of the present invention can be prepared in a known manner such as for example by ethoxylation of alkylphenols and alkanols and phosphorylation of ethoxylated hydroxy compounds. Representative alkylphenols include the $C_6$–$C_{12}$ straight and branched chain alkylphenols such as the hexylphenols, octylphenols, nonylphenols, decylphenols and dodecylphenols and mixtures thereof. Representative alkanols include dodecanol, tridecanol, hexadecanol, octadecanol and mixtures of such alkanols. Mixtures of these alkylphenols and alkanols can be also satisfactorily used in the present invention such as a mixture of nonylphenol and tridecanol. The number of ethoxy groups in the ethoxylated alkylphenol or alkanol portion of the ester may vary from 1 to about 20. A preferred number is from about 6 to about 10. Formation of the phosphate esters of the present invention from the ethoxylated alkylphenols and alkanols can be carried out by known methods such as described in J. Am. Ch. Soc., 77, 5351; 81, 2094; and Chemiker-Ztg., 81, 72–75.

The corresponding salts of the phosphate esters can be prepared by neutralization of the esters with caustice or potassium hydroxide or ammonium hydroxide.

A preferred phosphate ester is an admixture of 40–60% by weight of the phosphate monoester and 60–40% by weight of the phosphate diester. A particularly preferred composition comprises about 55% by weight of nonylphenoxypolyesthoxethyl phosphate and about 45% by weight of di(nonylphenoxypolyethoxyethyl) phosphate wherein the polyethoxy moiety in each ester contains an average of about 9 ethylene oxide groups which corresponds to the 10 ethylene oxide groups in the original exthoxylated hydroxy compound.

Another preferred mixed ethoxylated nonylphenol phosphate ester is a mixture of 40–60% monoester and 60–40% diester wherein each ester contains about 5 ethylene oxide groups in each polyethoxy moiety.

The preferred monoester derived from alkanol is a $C_{12}$–$C_{18}$ alkoxypolyethoxyalkyl phosphate wherein the alkoxy group is tridecoxy and the polyethoxy moiety is from 5 to 9 ethylene oxide groups. The corresponding diester contains similar esterifying groups and can be used in admixture with the aforesaid monoester.

In carrying out one aspect of the present invention the method thereof comprises introducing the scale prevention composition into the equipment to be protected, such as oil well tubing, in the form of an aqueous solution in an amount sufficient to provide the phosphate ester therein at a concentration of from about 0.0005 to about 0.005% by weight and maintaining the scale treating composition in contact with the internal surfaces thereof therein for a contact time sufficient to prevent and/or inhibit the development of scale deposits or additional scale deposits therein. It is desirable to circulate the scale prevention composition through the system to provide adequate contact of the composition with the surfaces to be protected. Underground strata surrounding the well bore can be treated in a like manner, i.e., by passing the solution into said strata such as by injection of the solution down through the bore hole or production tubing, preferably under pressure.

In general, it has been found that excellent protection against objectionable scale deposits can be obtained by maintaining the treating composition in contact with the scale for a contacting time period of from about 2 to about 24 hours, and preferably between about 4 to 12 hours. This contacting time period can also be advantageously used in areas containing some scale deposits such as oil field tubing to prevent or inhibit the build-up of additional scale deposits therein. In areas where heavy scale deposits are present or are likely to be encountered, the contacting time period can be extended to 24 hours or more without any harmful effects. If treatment is carried out at fairly frequent intervals with the composition of the present invention i.e. on a semiweekly or weekly basis, then shorter contacting times (e.g averaging about 4 to 10–12 hours) can be used. Less frequent treating intervals, i.e. at about every 10 or 15 days generally necessitate corresponding longer contacting times that may average between 12 and 24 hours.

The scale prevention composition of the present invention is used in an amount sufficient to provide to the treating solution the phosphate ester in an amount of from 0.0005% to 0.005% by weight and preferably the solution should have a pH of at least about 7.1. It has been found that excellent results are obtained with the phosphate ester at concentrations in the range of from about 0.001% to about 0.002% by weight, (10 to 20 p.p.m.). In areas containing apprecibale amounts of scale deposits, the build-up of additional scale deposits therein is also inhibited or prevented by use of the phosphate ester at a concentration of about 0.002 to 0.005%.

Amounts of phosphate ester below about 0.0005% are generally ineffective because at such low concentrations scale inhibition is not readily attained. Higher concentrations (above about 0.005%) do not provide improved scale protection.

It has been found to be desirable to use the phosphate ester in an alkaline aqueous medium to prevent corrosive attack of the treating equipment by the phosphate ester. In addition, the use of an alkaline medium with the phosphate ester appears to provide better inhibition against scale build-up.

If the phosphate ester is used rather than the alkali or ammonium salt thereof, one can use the produced formation water at the well site which is generaly alkaline, or the formation water can be readily treated with an alkaline material to obtain the required alkaline pH range thereto. For example, a neutral or slightly acidic formation water can be made alkaline by the addition thereto of a minor amount of an inorganic alkaline reagent thereto, such as sodium or potassium hydroxide or ammonium hydroxide thereto.

The treating composition can be prepared as an additive admixture of the phosphate ester and the alkalinity reagent with the admixture being incorporated in the aqueous system to provide protection. One may also add the components (phosphate ester and inorganic alkalinity reagent) separately to the aqueous system.

It has been found that the degree of scale prevention protection provided by the phosphate ester and alkaline reagent can be enhanced by employing the composition in an aqueous solution that is maintained at a temperature between about 100° F. and 200° F., preferably between 105° F. and 175° F. Such temperatures can be readily attained by the use of auxiliary heaters and the like as will be readily apparent to those skilled in the art. In treating oil well tubing and the strata surrounding a bore hole that is at an elevated temperature, one may raise the temperature of the scale prevention composition to the desired elevated temperature by briefly holding the solution in the bore hole until the selected operating temperature is attained.

A more complete understanding of the invention will be obtained from the following illustrative examples.

The following procedure was used in the evaluations.

A 1000 milliliter glass beaker was provided with sufficient calcium sulfate and sodium chloride, obtained by mixing solutions of calcium chloride and sodium sulfate, to produce an aqueous concentration thereof of 10,000 parts per million of calcium sulfate and 50,000 parts per million of sodium chloride. A preweighed metal rotor attached to an externally provided mechanical stirring device was immersed in the test solution for a twenty hour time period. The solution was maintained at a temperature of 103° F. during the test period. At the end of the 20 hours, the rotor was removed from the solution and from the stirrer, dried and reweighed. The difference in weight of the rotor is taken as the amount of calcium sulfate scale deposit build-up expressed in grams of scale. In all, 5 tests were conducted on each material being evaluated and the average of the 5 tests was taken as the amount of scale deposit. The above laboratory test procedure affords good correlation between the results thereby obtained and larger scale pilot evaluations of scale preventing compositions.

The following table records the results of the tests.

TABLE

| Example | Additive | Average Weight (Grams) of Calcium Sulfate Scale Developed After 20 Hours at 103° F.[1] | | | | |
|---|---|---|---|---|---|---|
| | | Amount of Additive (p.p.m.) | | | | |
| | | 0 | 5 | 10 | 20 | 50 |
| Control | | 1.581 | | | | |
| 1 | Alkapent M100 | | [2] 0.0347 | 0 | 0 | |
| 2 | Alkapent 6TD | | | 0.0052 | 0 | |
| 3 | Alkapent M60 | | | | 0.0228 | |
| 4 | DEPP [3] | | | | | 1.368 |
| 5 | DEP [4] | | | | | 1.482 |
| 6 | 50/50 mixture of EP and DEP [5] | | | | | 1.529 |
| 7 | EP [6] | | | | | 1.582 |
| 8 | PENP [7] | | 1.63 | 1.50 | 0.87 | |

[1] Average of 5 tests.
[2] 6 p.p.m.
[3] Diethyl pyrophosphate.
[4] Diethyl phosphite.
[5] Mono and diethyl phosphate.
[6] Ethyl phosphate.
[7] Polyethoxylated nonylphenol containing an average of 9.5 ethylene oxide groups.

In the table, the phosphate ester of Example 1, sold under the trade name "Alkapent M 100" is a mixed ester consisting essentially of 50–60% by weight of a branched chain nonylphenoxypolyethoxyethyl phosphate and 30–40% of di(branched chain nonylphenoxypolyethoxyethyl) phosphate, the average polyethoxy group moiety being 9, the balance comprising up to 10% of unreacted polyethoxynonylphenol and 2–4% phosphoric acid. The phosphorous content was 4.0–4.3% and the ester required about 1.3 and 2.4 milliequivalents of base, respectively, to a pH of 5.5 and 9.5, respectively. The ester sold under the trade name "Alkapent 6 TD" is a polyethoxylated tridecoxy phosphate containing an average of 6 ethylene oxide groups. The ester sold under the trade name "Alkapent M 60" contains an average of 6 ethylene oxide groups in the polyethoxy moiety, the phosphorous content is 5.2–5.5%, the milliequivalents of base to pH 5.5 is 1.7 and milliequivalents of base to pH 9.5 is 3.0.

The polyethoxylated nonylphenol of Example 8 is sold under the trade name "Sulfonic N-95" and is an ethoxylated nonylphenol containing an average of 9.5 ethylene oxide groups.

Inspection of the test results on the various compositions of Examples 1–8 in the above table shows that only the compositions of the present invention, namely Examples 1–3 are effective in materially reducing the build-up of scale deposits. The data for these examples show that increasing the concentration of the composition results in decreased amounts of scale build-up during the test period. The table further shows that other materials, particularly the lower alkyl esters of phosphorous acids (Examples 4–7), were relatively not effective or were completely ineffective in reducing the build-up of the scale under similar test conditions and periods.

Example 8 shows that in the absence of phosphoric acid the polyoxyethylated nonylphenol containing about 9.5 ethoxy groups was an ineffective inhibitor for calcium sulfate scale in comparison with the "higher hydroxyaryl and alkyl" esters of phosphoric acid. The amount of scale developed in Example 8 (0.87 gram) was approximately 38 times more than the amount of scale in Example 3 (the poorest of the higher alkyl phosphate esters) at a concentration of 20 p.p.m.

The composition of the present invention has been successfully field tested in a number of wells in a producing area having a history of calcium sulfate scale deposition problems with good results. The composition was employed at a concentration of about 20 p.p.m. in water and was introduced into the prewet well tubing by means of a pump, circulated therethrough and the well shut in for a period of about 24 hours. Periodic treatments several times a week have been effective in preventing the build-up of scale deposits in a treated well.

The phosphate esters of the present invention can be made up as a concentrate with the alkalinity agent in an aqueous or an aqueous-glycol or an aqueous-alkanol medium. The aqueous-glycol medium is preferred as there appears to be some additive effect resulting from the use of this particular medium in combination with the phosphate ester and the alkalinity agent.

Representative glycols in the concentrate include ethylene and propylene glycol. Representative alkanols include methanol, ethanol, propanol and isopropanol.

Suitable ranges for the various components of the concentrate composition are, on a weight basis, from about 10 to about 25% of the phosphate ester, from about 0.75 to about 3.0% of alkalinity agent (sodium hydroxide or equivalent), 0 to 40% glycol or alkanol, the balance water.

The particularly preferred compositions of the present invention comprises about 21.55% of the phosphate ester, 4.32% of 50% caustic and 74.13% of water, on a weight basis, and with the glycol the preferred concentrate comprises 15.6% of the phosphate ester, 27.61% of ethylene glycol, 3.12% of 50% caustic and 53.67% of water, on a weight basis.

I claim:

1. A method of controlling the build-up of calcium sulfate scale deposits in an aqueous system which comprises incorporating in said system a scale treating composition consisting essentially of a phosphate ester having the general formula

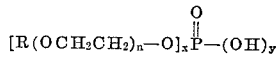

wherein R is a $C_6$–$C_{12}$ alkylphenyl radical or a $C_{12}$–$C_{18}$ alkyl radical, $n$ is a number from 1 to 20, both $x$ and $y$ are 1 or 2 and the sum of $x$ and $y$ is 3, said ester having a molecular weight in the range of from about 500 to about 1000, and being used in an amount from about 0.0005 to 0.005% by weight of said ester to inhibit the development of scale in said system.

2. Method as claimed in claim 1 wherein said ester is a monoester of phosphoric acid esterified with an ethoxylated nonylphenol containing from about 6 to 10 ethoxy groups.

3. Method as claimed in claim 1 wherein said ester is a diester of phosphoric acid esterified with an ethoxylated nonylphenol containing from about 6 to 10 ethoxy groups.

4. Method as claimed in claim 1 wherein said ester is a monoester of phosphoric acid esterified with an ethoxylated $C_{12}$–$C_{18}$ alkanol containing from about 6 to 10 ethoxy groups.

5. Method as claimed in claim 1 wherein said ester is a diester of phosphoric acid esterified with an ethoxylated $C_{12}$–$C_{18}$ alkanol containing from about 6 to 10 ethoxy groups.

6. Method as claimed in claim 1 wherein said ester is an admixture of a monoester and a diester of phosphoric acid esterified with an ethoxylated nonylphenol containing from 6 to 10 ethoxy groups.

7. Method as claimed in claim 1 wherein said ester consists essentially of a mixture of a monoester and a diester of phosphoric acid esterified with an ethoxylated $C_{12}$–$C_{18}$ alkanol containing from about 6 to 10 ethoxy groups.

8. Method as claimed in claim 1 wherein said ester comprises a mixture of 40–60% by weight of nonylphenoxypolyethoxyethyl phosphate and 60–40% by weight of di(nonylphenoxypolyethoxyethyl) phosphate, each polyethoxy moiety containing an average of about 5 ethoxy groups.

9. Method as claimed in claim 1 wherein said phosphate ester is present in said system in an amount of from about 0.001% to about 0.002% by weight.

10. Method as claimed in claim 1 wherein said ester is present in the form of the sodium salt.

11. A calcium sulfate scale inhibiting composition consisting essentially of an alkaline aqueous solution of a phosphate ester having the general formula:

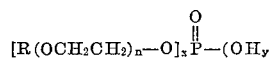

wherein R is a $C_6$–$C_{12}$ alkylphenyl radical or a $C_{12}$–$C_{18}$ alkyl radical, $n$ is a number from 1 to 20, $x$ and $y$ are 1 or 2 and the sum of $x$ and $y$ is 3, said ester having a molecular weight in the range of from about 500 to about 1000, and being used in an amount of from about 0.0005 to 0.005% by weight to inhibit the development of scale and an inorganic alkaline reagent which is present in said aqueous solution in an amount sufficient to provide a pH range of from about 7.1 to about 8 thereto.

12. Composition as claimed in claim 11 wherein said phosphate ester is present in the aqueous solution in a concentration between 0.001 and 0.002% by weight.

13. A scale inhibiting composition as claimed in claim 11 containing from about 40 to 60% by weight of the sodium salt of nonylphenoxypolyethoxyethyl phosphate and from about 60–40% by weight of the sodium salt of di(nonylphenoxypolyethoxyethyl) phosphate wherein the average number of ethoxy groups in each polyethoxy moiety is between 5 and 9.

14. A scale inhibiting composition as claimed in claim 11 containing from about 40–60% by weight of the sodium salt of a $C_{12}$–$C_{18}$ alkoxypolyethoxyethyl phosphate and from about 60–40% by weight of the disodium salt of di($C_{12}$–$C_{18}$ alkoxypolyethoxyethyl) phosphate wherein the average number of ethoxy groups in each polyethoxy moiety is between 5 and 9.

15. A calcium sulfate scale inhibitor additive composition, said composition consisting essentially of on a weight basis from about 10 to 25% of a phosphate ester selected from the group consisting of a phosphate ester and a mixture of said esters having the general formula:

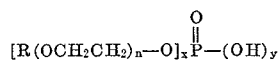

wherein R is a $C_6$–$C_{12}$ alkylphenyl radical or a $C_{12}$–$C_{18}$ alkyl radical, $n$ is a number from 1 to 20, both $x$ and $y$ are 1 or 2 and the sum of $x$ and $y$ is 3, said ester having a molecular weight in the range of from about 500 to about 1000, from about 0.75 to about 3.0% of a compatible inorganic alkalinity agent, 0 to 40% of a glycol selected from the group consisting of ethylene glycol and propylene glycol, the balance water, said composition being used in an amount to provide from 0.0005 to 0.005% by weight of said phosphate ester to inhibit the build-up of said scale.

16. A calcium sulfate scale inhibitor additive composition, said composition consisting essentially of on a weight basis from about 10 to 25% of a phosphate ester selected from the group consisting of a phosphate ester and a mixture of said esters having the general formula:

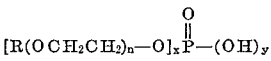

wherein R is a $C_6$–$C_{12}$ alkylphenyl radical or a $C_{12}$–$C_{18}$ alkyl radical, $n$ is a number from 1 to 20, both $x$ and $y$ are 1 or 2 and the sum of $x$ and $y$ is 3, said ester having a molecular weight in the range of from about 500 to about 1000, from about 0.75 to about 3.0% of a compatible inorganic alkalinity agent, 0 to 40% of a lower monohydric alcohol, the balance water, said composition being used in an amount to provide from 0.0005 to 0.005% by weight of said phosphate ester to inhibit the build-up of said scale.

References Cited

UNITED STATES PATENTS

| | | | |
|---|---|---|---|
| 2,777,818 | 1/1957 | Gambill | 252—8.55 |
| 3,091,589 | 5/1963 | Brukner | 260—950 |
| 3,346,670 | 10/1967 | Papalos | 260—950 |
| 3,380,927 | 4/1968 | Edelstein et al. | 260—950 |

MAYER WEINBLATT, Primary Examiner

W. SCHULZ, Assistant Examiner

U.S. Cl. X.R.

21—2.7; 210—58; 252—8.55